United States Patent
Giobbi

(10) Patent No.: US 9,251,332 B2
(45) Date of Patent: Feb. 2, 2016

(54) SECURITY SYSTEM AND METHOD FOR CONTROLLING ACCESS TO COMPUTING RESOURCES

(75) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 1292 days.

(21) Appl. No.: 12/340,501

(22) Filed: Dec. 19, 2008

(65) Prior Publication Data
US 2009/0165123 A1   Jun. 25, 2009

Related U.S. Application Data

(60) Provisional application No. 61/015,110, filed on Dec. 19, 2007.

(51) Int. Cl.
  *G06F 21/00*  (2013.01)
  *H04L 9/32*   (2006.01)
  *G06F 21/35*  (2013.01)
  *G06F 21/34*  (2013.01)

(52) U.S. Cl.
  CPC ............ *G06F 21/35* (2013.01); *G06F 21/34* (2013.01); *G06F 2221/2115* (2013.01)

(58) Field of Classification Search
  CPC ..... G07F 17/32; G07F 7/1008; G07F 7/0886; G06K 19/07749; G06K 19/0723; H04W 12/06; H04W 84/18; H04W 84/12; H04W 4/008; G06Q 20/341; G06Q 20/32; G06Q 20/10; G06Q 20/3278; G06Q 20/327; G06Q 20/352; H04L 63/0492; H04L 2209/80; H04L 2012/2841; G06F 21/34; G06F 21/35; G06F 2221/2115

USPC ................................................ 726/16, 21, 27
See application file for complete search history.

(56) References Cited

U.S. PATENT DOCUMENTS

| | | | |
|---|---|---|---|
| 5,541,583 A | | 7/1996 | Mandelbaum |
| 5,854,891 A | * | 12/1998 | Postlewaite et al. ............. 726/20 |
| 6,040,786 A | | 3/2000 | Fujioka |
| 6,279,111 B1 | * | 8/2001 | Jensenworth ......... G06F 21/335 713/159 |
| 6,325,285 B1 | | 12/2001 | Baratelli |
| 6,633,981 B1 | | 10/2003 | Davis |

(Continued)

OTHER PUBLICATIONS

NPL "magicJack: Could It Be the Asterisk Killer?" (Aug. 1, 2007) by Nerd Vittles; 2 pages; converted to PDF originally from http://nerdvittles.com/index.php?p=187.*

(Continued)

*Primary Examiner* — Catherine Thiaw
(74) *Attorney, Agent, or Firm* — Patent Law Works LLP

(57) ABSTRACT

A security system comprises a personal digital key (PDK), a reader and a computing device. The PDK is a portable, personal transceiver that includes a controller and one or more passwords or codes. The computing device includes a detection engine, vault storage and a set up module. The detection engine detect events relating to the access of any files and third-party systems by the computing device and receives information from the reader as to whether the PDK is present/linked. The detection engine controls whether a user is able to access any of the functionality provided by the computing device based upon whether the PDK is in communication with the reader or not. The present invention also includes a number of methods such as a method for initializing the security system, a method for setting up a computing device, and a method for controlling access to computing resources.

23 Claims, 14 Drawing Sheets

(56) References Cited

U.S. PATENT DOCUMENTS

| | | | |
|---|---|---|---|
| 6,892,307 B1* | 5/2005 | Wood .................... G06F 21/41 713/155 |
| 7,458,510 B1* | 12/2008 | Zhou .......................... 235/381 |
| 7,676,380 B2 | 3/2010 | Graves et al. |
| 8,387,124 B2* | 2/2013 | Smetters et al. ................. 726/9 |
| 2002/0010679 A1 | 1/2002 | Felsher |
| 2003/0088441 A1 | 5/2003 | McNerney |
| 2003/0137404 A1* | 7/2003 | Bonneau et al. ........... 340/10.41 |
| 2004/0030764 A1* | 2/2004 | Birk ................... H04L 61/1523 709/223 |
| 2004/0128389 A1* | 7/2004 | Kopchik ...................... 709/228 |
| 2004/0128500 A1* | 7/2004 | Cihula .................. G06F 21/34 713/155 |
| 2004/0128508 A1* | 7/2004 | Wheeler ................ G06F 21/33 713/170 |
| 2004/0167465 A1 | 8/2004 | Mihai |
| 2005/0005136 A1 | 1/2005 | Chen et al. |
| 2005/0050324 A1* | 3/2005 | Corbett et al. ................ 713/168 |
| 2005/0055242 A1 | 3/2005 | Bello |
| 2005/0055244 A1 | 3/2005 | Mullan |
| 2005/0091338 A1* | 4/2005 | de la Huerga ................ 709/217 |
| 2005/0114150 A1 | 5/2005 | Franklin |
| 2005/0138390 A1* | 6/2005 | Adams et al. ................ 713/185 |
| 2005/0139656 A1 | 6/2005 | Arnouse |
| 2005/0154897 A1* | 7/2005 | Holloway et al. ............ 713/183 |
| 2005/0182661 A1 | 8/2005 | Allard et al. |
| 2005/0187792 A1 | 8/2005 | Harper |
| 2005/0216313 A1 | 9/2005 | Claud et al. |
| 2005/0220046 A1* | 10/2005 | Falck et al. .................. 370/315 |
| 2005/0229240 A1* | 10/2005 | Nanba ............................... 726/6 |
| 2006/0022042 A1 | 2/2006 | Smets et al. |
| 2006/0026673 A1* | 2/2006 | Tsuchida ........................ 726/9 |
| 2006/0041746 A1* | 2/2006 | Kirkup et al. ................. 713/168 |
| 2006/0074713 A1 | 4/2006 | Conry et al. |
| 2006/0136742 A1 | 6/2006 | Giobbi |
| 2006/0144943 A1 | 7/2006 | Kim |
| 2006/0165060 A1* | 7/2006 | Dua ............................ 370/352 |
| 2006/0229909 A1 | 10/2006 | Kaila et al. |
| 2006/0273176 A1 | 12/2006 | Audebert |
| 2006/0279412 A1* | 12/2006 | Holland et al. ............ 340/10.51 |
| 2007/0005403 A1 | 1/2007 | Kennedy et al. |
| 2007/0019845 A1 | 1/2007 | Kato |
| 2007/0033072 A1 | 2/2007 | Bildirici |
| 2007/0100939 A1 | 5/2007 | Bagley |
| 2007/0118891 A1* | 5/2007 | Buer ................................. 726/8 |
| 2007/0158411 A1 | 7/2007 | Krieg, Jr. |
| 2007/0159301 A1 | 7/2007 | Hirt et al. |
| 2007/0159994 A1 | 7/2007 | Brown |
| 2007/0204078 A1 | 8/2007 | Boccon-Gibod |
| 2007/0245157 A1 | 10/2007 | Giobbi |
| 2007/0260888 A1 | 11/2007 | Giobbi |
| 2007/0266257 A1* | 11/2007 | Camaisa et al. ............. 713/182 |
| 2007/0288752 A1* | 12/2007 | Chan ..................... G06F 21/34 713/171 |
| 2008/0005432 A1* | 1/2008 | Kagawa ........................ 710/106 |
| 2008/0028453 A1* | 1/2008 | Nguyen et al. ..................... 726/9 |
| 2008/0046715 A1* | 2/2008 | Balazs .................... G06F 21/33 713/152 |
| 2008/0071577 A1 | 3/2008 | Highley |
| 2008/0095359 A1* | 4/2008 | Schreyer et al. ................. 380/44 |
| 2008/0129450 A1 | 6/2008 | Riegebauer |
| 2008/0149705 A1 | 6/2008 | Giobbi et al. |
| 2008/0150678 A1 | 6/2008 | Giobbi et al. |
| 2008/0228524 A1 | 9/2008 | Brown |
| 2008/0235144 A1* | 9/2008 | Phillips .......................... 705/67 |
| 2008/0251579 A1 | 10/2008 | Larsen |
| 2008/0316045 A1 | 12/2008 | Sriharto et al. |
| 2009/0033485 A1* | 2/2009 | Naeve et al. ............. 340/539.23 |
| 2009/0036164 A1* | 2/2009 | Rowley ........................ 455/558 |
| 2009/0076849 A1 | 3/2009 | Diller |
| 2009/0140045 A1* | 6/2009 | Evans .......................... 235/382 |
| 2009/0176566 A1 | 7/2009 | Kelly |
| 2009/0239667 A1 | 9/2009 | Rowe et al. |
| 2009/0313689 A1* | 12/2009 | Nystrom et al. .................. 726/9 |

OTHER PUBLICATIONS

"Automate proximity and location-based computer actions" (Jun. 5, 2007) by Adam Pash; 3 pages; converted to PDF originally from http://lifehacker.com/265822/automate-proximity-and-location+based-computer-actions.*

"Automatically unlock PC when entering proximity" (Dec. 7, 2005) by bohrsatom et al.; ; converted to PDF originally from http://www.salling.com/forums/viewtopic.php?t=3190.*

NPL "Imation USB 2.0 Micro Hard Drive" (Nov. 22, 2005) by Dan Costa; 2 pages; converted to PDF originally from http://www.pcmag.com/article2/0,2817,1892209,00.asp.*

"SplashID—Secure Password Manager for PDAs and Smartphones" (Mar. 8, 2007) by SplashID; 2 pages; converted to PDF originally from http://www.splashdata.com/splashid/ via http://www.archive.org/.*

NPL "BlueProximity—Leave it—its locked, come back—its back too . . . " (Aug. 26, 2007) by BlueProximity; 1 page; converted to PDF originally from http://blueproximity.sourceforge.net/ via http://www.archive.org/.*

"File Security, Keychains, Encryption, and More with Mac OS X (10.3+)" (Apr. 4, 2005) by John Hendron; 30 pages; originally downloaded from http://www.johnhendron.net/documents/OSX_Security.pdf.*

NPL "Smart Card Setup Guide" (2006) by Apple et al.; 16 pages; originally downloaded from http://manuals.info.apple.com/en_US/Smart_Card_Setup_Guide.pdf.*

PCT International Search Report and Written Opinion, PCT Application No. PCT/US08/87835, Feb. 11, 2009, 8 pages.

International Preliminary Report and Written Opinion of the International Searching Authority, Jul. 1, 2010, 8 pages.

International Search Report and Written Opinion, PCT/US09/34095, Mar. 25, 2009, 11 pages.

* cited by examiner

SECURITY SYSTEM AND METHOD FOR CONTROLLING ACCESS TO COMPUTING RESOURCES

CROSS REFERENCE TO RELATED APPLICATIONS

The present application claims the benefit of priority under 35 U.S.C. §119(e) of U.S. Provisional Application No. 61/015,110 entitled "ProxAccess," filed on Dec. 19, 2007 by John J. Giobbi, the entire contents of which are incorporated by reference herein.

BACKGROUND OF THE INVENTION

1. Field of the Invention

The present invention relates to a system and method for controlling access to computing resources. More specifically, the present invention relates to a security system that requires the presence of a personal digital key (PDK) before secure computing resources can be accessed.

2. Description of the Related Art

The use and proliferation of personal computers and other similar computing systems have become widespread. In many cases, a user may have several computers with which she interacts. For example, the user may have a personal computer at their office, a laptop for personal use and a family computer. Additionally, the user may have a cell phone, a personal digital assistant, or other individualized computing devices. Increasingly, these computers store confidential and sensitive information such as contacts lists, financial information, business information and identification information. Most currently existing systems have only a minimal amount of security protection such as requiring a user to enter a password before their personal computer becomes operational.

These computer systems are often used to access third-party systems. These third-party systems often require a user identification name and a password before the user will be granted access. Each of the individual third-party systems often has different requirements both in terms of user name and in terms of password format. Moreover, as the world becomes increasingly digital, the owners of these third-party systems want to ensure security of their systems and prevent fraudulent use. Thus, the third parties often require that the users change their passwords after a predetermined period of time or a predetermined number of accesses to the system. Most users have several external systems, and many users have as many as a hundred of third-party systems that are accessed on a regular basis. Therefore, it is often difficult for users to remember the myriad of user name and password combinations that are required to access such third-party systems and.

Additionally, many of the third-party systems are providing highly confidential information that is received by the end stored on the user's individual computer systems. These data files often contain sensitive information such as bank account records, tax returns, credit card information, and investment information. Furthermore, other personal information is also stored on such computer systems. Such personal information can be used for identity theft in the event that information falls into the wrong hands. While there are file encryption systems and mechanisms in the prior art, these systems are often difficult to use because they require that the user specify which files are encrypted, provide a password, and such administrative overhead in securing sensitive information stored on the hard drive of a personal computer makes the use of such systems rare.

Thus there is a need for a system and method that secures computing systems automatically and in a nonintrusive way.

SUMMARY OF THE INVENTION

The present invention overcomes the deficiencies of the prior art with a security system and method for controlling access to computing resources. In one embodiment, the security system comprises a personal digital key (PDK), a reader and a computing device. The PDK is a portable, personal transceiver that includes a controller and one or more passwords or codes. The PDK is able to link and communicate with the reader via a wireless radio frequency (RF) signal. The reader is a device that is able to wirelessly communicate with the PDK and also provides a wired output signal line for sending data, applications and other information. The reader is coupled to the computing device. The computing device includes a detection engine, vault storage and a set up module. The detection engine detects events relating to the access any files and third-party systems by the computing device and receives information from the reader as to whether the PDK is present/linked. The detection engine controls whether a user is able to access any of the functionality provided by the computing device based upon whether the PDK is in communication with the reader or not. The PDK and/or the vault storage include encrypted information such as usernames, passwords and other information utilized by the computing device to grant access to components, files and third-party systems. The security system is particularly advantageous because the PDK, reader and computing device automatically cooperate as a security system to either allow or deny access to the functionality provided by the computing device. More specifically, the user need not do anything, while in the background the PDK, the reader and the computing device communicate and exchange information to enable or disable access to information and third-party systems using the computing device. The present invention also includes a number of methods such as a method for initializing the security system, a method for setting up a computing device, and a method for controlling access to computing resources.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
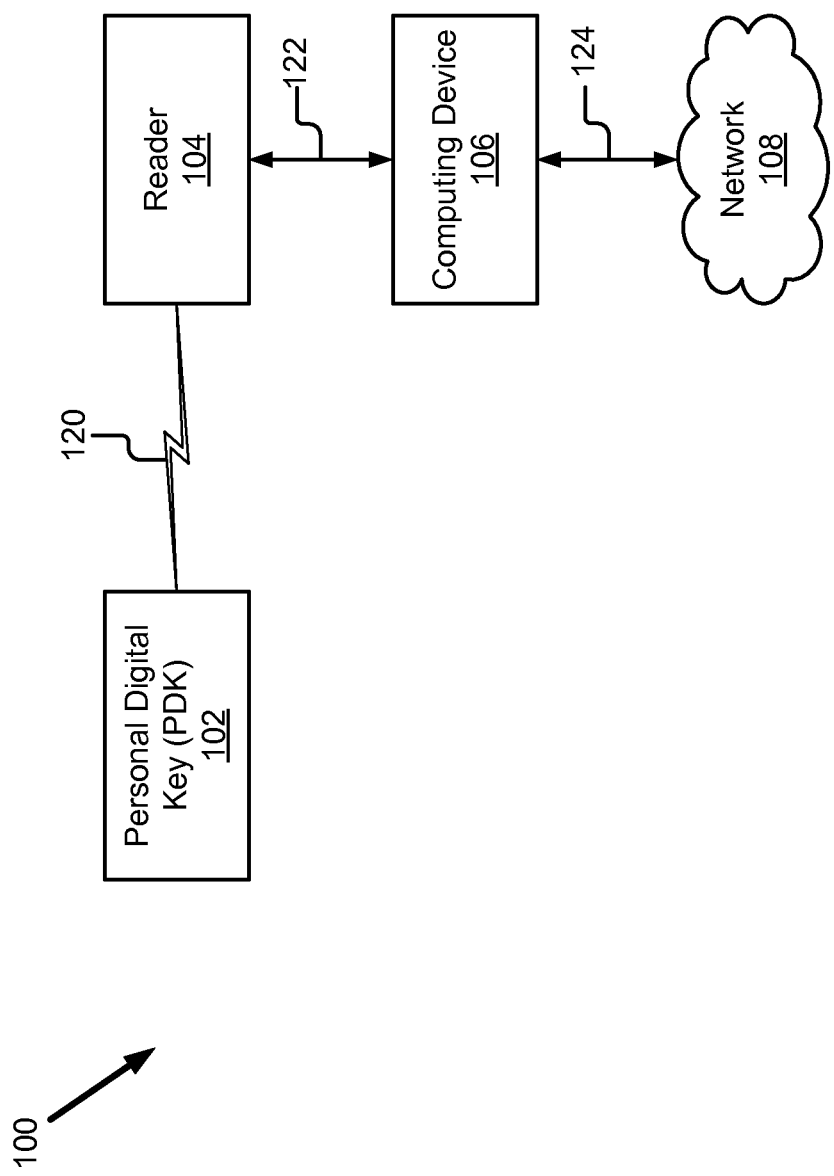
FIG. 1 is a block diagram of a first embodiment of a security system in a first state in accordance with the present invention.

A security system and method for controlling access to computing resources is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to a controlling access to a personal computer. However, those skilled in the art will recognize that the present invention applies to access to any other device that may include a computer or is computer controlled.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

FIG. 1 shows an embodiment of a security system 100 for controlling access to computing resources in accordance with the present invention. The security system 100 comprises a personal digital key (PDK) 102, a reader 104 and a computing device 106. As shown in FIG. 1, the computing device 106 is also coupled by signal line 124 to a network 108. More particularly, FIG. 1 shows the security system 100 in a first state in which the PDK 102 is linked and in communication with the reader 104.

The PDK 102 is a portable, personal key that wirelessly communicates (e.g., using radio frequency (RF) signals) with the reader 104. The PDK 102 includes an area for storing security information including sign-on records, a set up information, user names, passwords, etc. The PDK 102 is will be described below in more detail with reference to FIG. 5. The PDK 102 also includes logic for initiating and maintaining contact with the reader 104 when it is within range. FIG. 1 illustrates an example where the PDK 102 is within range of the reader 104 and a link 120 has been established between them.

The reader 104 is a device that is able to wirelessly communicate with the PDK 102 and also provides signals on line 122 for sending data, applications and other information to the computing device 106. One of the major functions of the reader 104 is to detect PDKs 102 within communication range and establish links to them. The reader 104 primarily acts as an intermediary to pass information about the PDK 102 to the computing device 106. The reader 104 automatically signals the computing device 106 when it is linked to the PDK 102 and when the link 120 is severed. The reader 104 also includes an area for storage of applications and set up information that can be provided to the computing device 106 during initialization. The reader 104 will be described in more detail below with reference to FIG. 6.

The computing device 106 may be any conventional device such as but not limited to a personal computer, a laptop computer, a smart phone, a personal digital assistant, etc. The computing device 106 also includes a detection engine 760, vault storage 762 and a set up module 764 (see FIG. 7). The detection engine 760 detects events relating to the access any components, files or third-party systems by the computing device 106. The detection engine 760 also receives information from the reader 104 as to whether the PDK is present or linked. The detection engine 760 controls whether a user is able to access any of the functionality provided by the computing device 106 based upon whether the PDK is in communication with the reader or not. One embodiment for the computing device 106 is described in more detail below with reference to FIG. 7.

The PDK 102 and/or the vault storage 762 includes encrypted information such as usernames, passwords, and other information utilized by the computing device 106 to grant access to components, files and third-party systems. The present invention is particularly advantageous because the PDK 102, reader 104 and computing device 106 automatically cooperate as a security system 100 to either allow or deny access to the functionality provided by the computing device 106. More specifically, the user need not do anything but carry the PDK 102 on his or her person, and in the background the PDK 102, reader 104 and computing device 106 communicate and exchange information to enable or disable access to information and third-party systems using the computing device.

Figure 2:
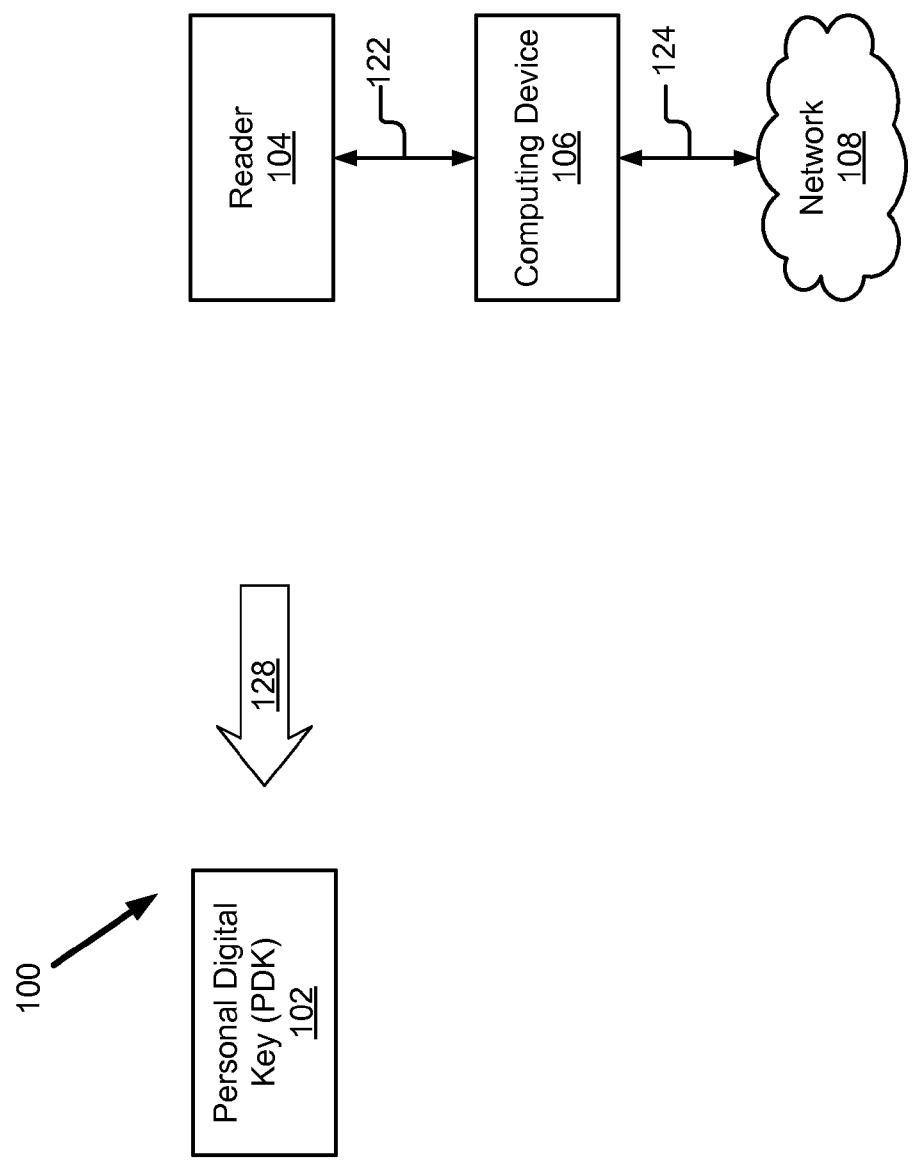
FIG. 2 is a block diagram of the first embodiment of the security system in a second state in accordance with the present invention.

Referring now FIG. 2, the same embodiment of the security system 100 described above with reference to FIG-. 1 is shown. However, FIG. 2 depicts a situation in which the PDK 102 has moved outside of communication range with the reader 104 as indicated by arrow 128. Specifically, FIG. 2 shows a second state in which the PDK 102 is no longer in communication and linked with the reader 104. Thus, in comparison to FIG. 1, there is no longer the link 120 between the PDK 102 and the reader 104. As will be described in more detail below, when the PDK 102 and the reader 104 are within communication range of each other, they automatically establish the link 120. Similarly, when they are outside of the communication range of each other, the link 120 is automatically severed. Whether the PDK 102 and the reader 104 are in the first state (link) or the second state (no link) is automatically communicated by the reader 104 to the computing device 106 and serves as a control signal to determine whether the functionality provided by the computing device 106 is enabled. More specifically, once the PDK 102 is in the state as shown in FIG. 2, the computing device 106 is disabled and does not allow the user to use any of the components, files or third-party systems that are typically accessed were part of the computing device 106.

Figure 3:
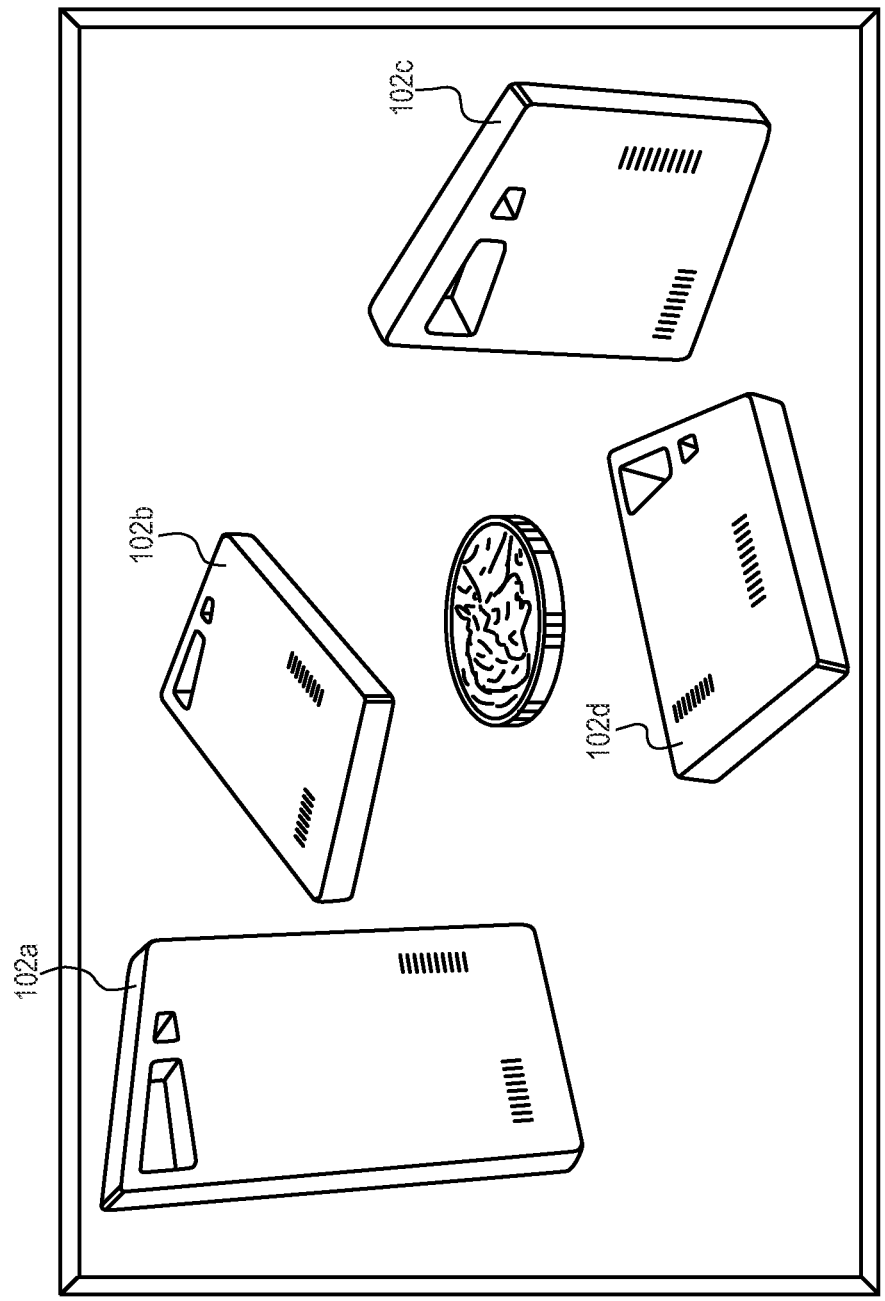
FIG. 3 is a perspective view of a plurality of personal digital keys (PDK) in accordance with one embodiment of the present invention.

Referring now to FIG. 3, a plurality of PDKs 102a-102d in accordance with one embodiment of the present invention is shown. As can be seen, the PDKs 102a-102d are very small in size being less that 1" X .5" X .25". Thus, the PDK 102 is small enough to be attached to a user's key chain or placed in their pocket. In other embodiments, the PDK 102 is integrated as part of a cellular telephone or other portable electronic devices. Furthermore, the PDK 102 is particularly advantageous because it is able to communicate with them and establish the link 120 with corresponding reader 104 even when positioned inside a user's pocket, within clothing or inside a purse or case. Even when obscured from direct view or line of sight, the PDK 102 can establish the link 120 as long as it is positioned within five or less meters of the reader 104. However, those skilled in the art will realize that the effective communication range between the reader 104 and PDKs 102 is completely scalable and can be distances greater than five meters for other environments and conditions when greater distances are needed. In contrast to the prior art that requires that he be placed within 10 or less inches of the reader, the PDK 102 also does not need to be placed in very close proximity to the reader 104. Therefore, the security system 100 is particularly advantageous because the PDKs 102 provide a portable, automatic, continuous, effortless way for users to provide security, automatic sign-on and protection, device protection or file protection. The users do not need to remember another username and password or be concerned about its loss. Once the PDK 102 is out of range of the reader 104, the computing device 106 and the computing resources are provided are secure.

Figure 4:
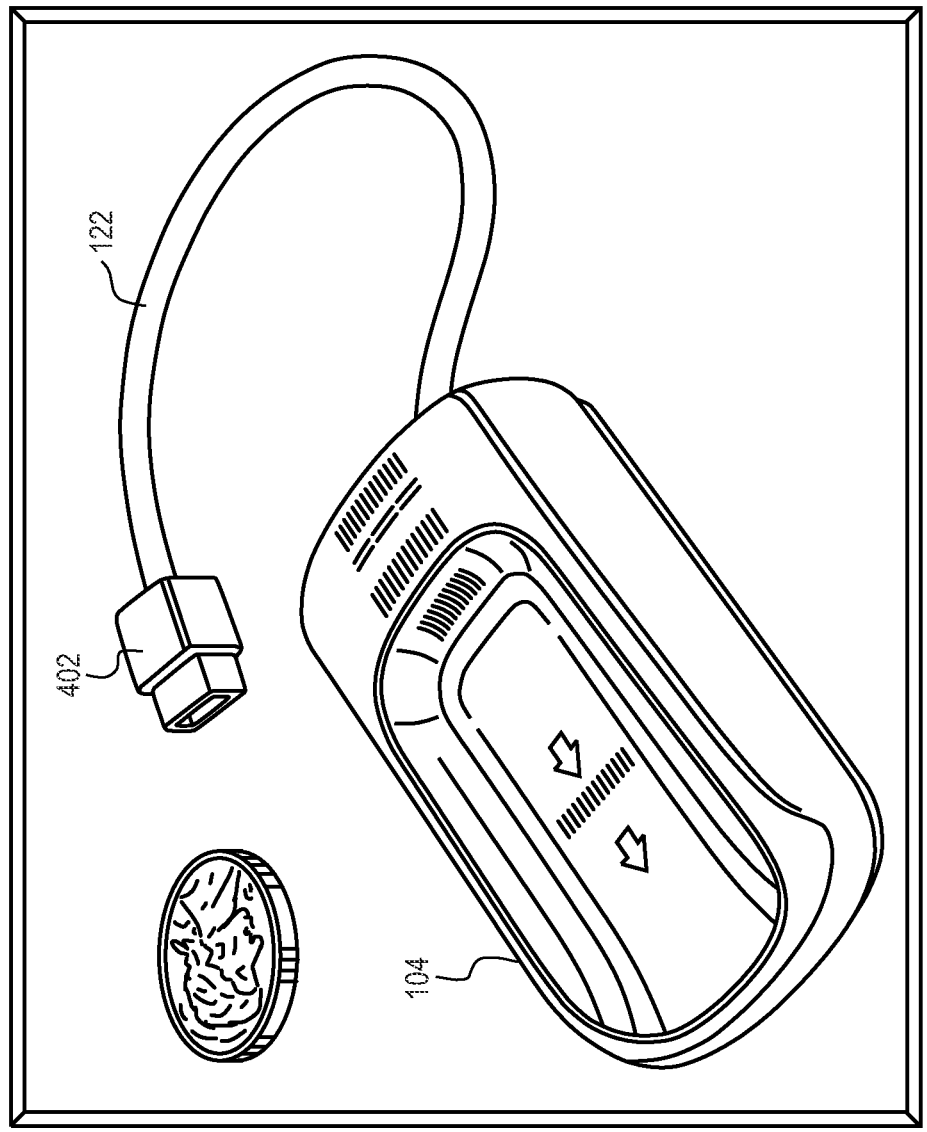
FIG. 4 is a perspective view of a reader in accordance with one embodiment of the present invention.

Referring now to FIG. 4, a perspective view of the reader 104 in accordance with one embodiment of the present invention is shown. In this embodiment, the reader 104 is also small in size being about 2 to 3 times the size of the PDK 102. The reader 104 also includes an area adapted to receive a PDK 102 in the event the user wants to place the PDK 102 directly on top of the reader 104. The PDK 102 is coupled to signal line 122 in the form of a cable. At a remote end of the cable it is, it is attached to a USB connector 402. Using the USB connector 402, the reader 104 may be directly coupled to the computing device 106. Those skilled in the art will recognize that in other embodiments, the reader 104 is built into a laptop computer or a personal computer similar to other input/output devices like finger print readers and bar code readers.

Figure 5:
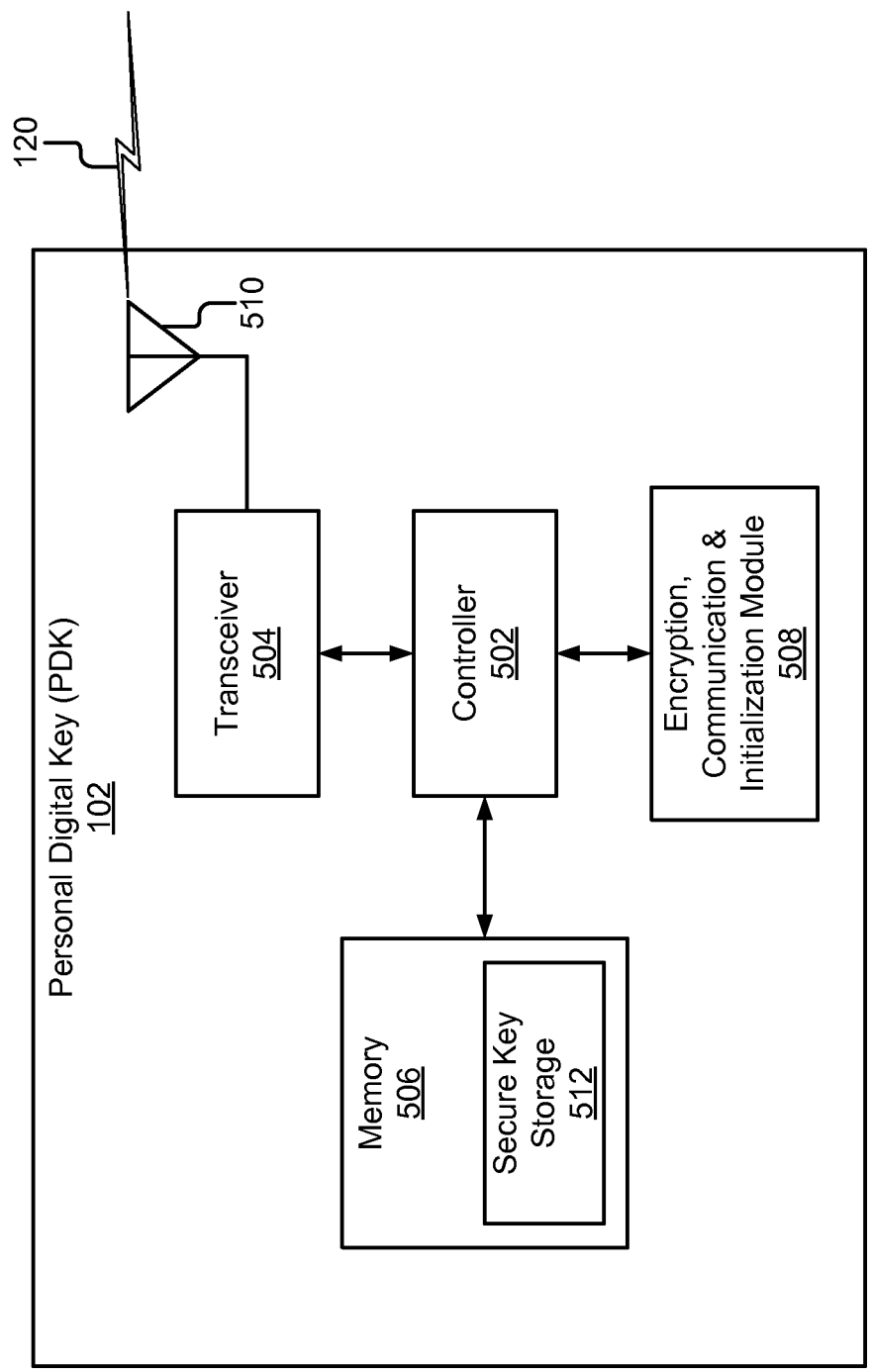
FIG. 5 is a block diagram of an embodiment of the PDK in accordance with the present invention.

Referring now to FIG. 5, an embodiment of the PDK 102 in accordance with the present invention is described. The PDK 102 comprises a controller 502, a transceiver 504, a memory 506 having a secure key storage 512, an encryption, communication and initialization module 508 and an antenna 510. The controller 502 is coupled to the transceiver 504, the memory 506 and the encryption, communication and initialization module 508. The controller 502 cooperates with the transceiver 504 to send and receive data and control signals to and from the PDK 102. The controller 502 cooperates with the memory 506 to store and retrieve information from the memory 506. In particular, the memory 506 includes the secure key storage 512. The secure key storage 512 can be used to store sign-on records and other set up data. The secure key storage area 512 is also used to store and encrypted user names and passwords. The transceiver 504 is coupled to the antenna 510 and the controller 502. The transceiver 504 receives and sends information to and from the controller 502 and also generates and receives radio frequency signals. In one embodiment the operation of the PDK 102 is dictated by the encryption, communication and initialization module 508 that is coupled to and controls the operation of the controller 502. The encryption, communication and initialization module 508 controls the initialization of the PDK 102 such as assigning it a unique ID. The encryption, communication and initialization module 508 also controls the communication of the PDK 102 with the reader 104 such as initializing and establishing the link 120, maintaining the link 120, and searching for readers 104 within range. The encryption, communication and initialization module 508 also controls the interaction of the PDK 102 with the reader 104 in terms of responding to requests for information and encrypted and storing information received from the reader 104. The encryption, communication and initialization module 508 also includes controls the encryption and decryption of data stored in and retrieved from the memory 506, in particular the secure key storage 512.

Additional details about other embodiments of the PDK 102 are shown and described in U.S. patent application Ser. No. 12/292,330, filed a Nov. 30, 2005 entitled "Personal Digital Key And Receiver/Decoder Circuit System And Method;" U.S. patent application Ser. No. 11/620,581, filed Jan. 5, 2007 entitled "Wireless Network Synchronization Of Cells And Client Devices On A Network;" U.S. patent application Ser. No. 11/744,831, filed May. 5, 2007, entitled "Two-Level Authentication For Secure Transactions;" and U.S. patent application Ser. No. 11/744,832, filed May. 5, 2007, entitled "Personal Digital Key Initialization And Registration For Secure Transactions;" the contents of which are incorporated by reference herein in their entirety.

Figure 6:
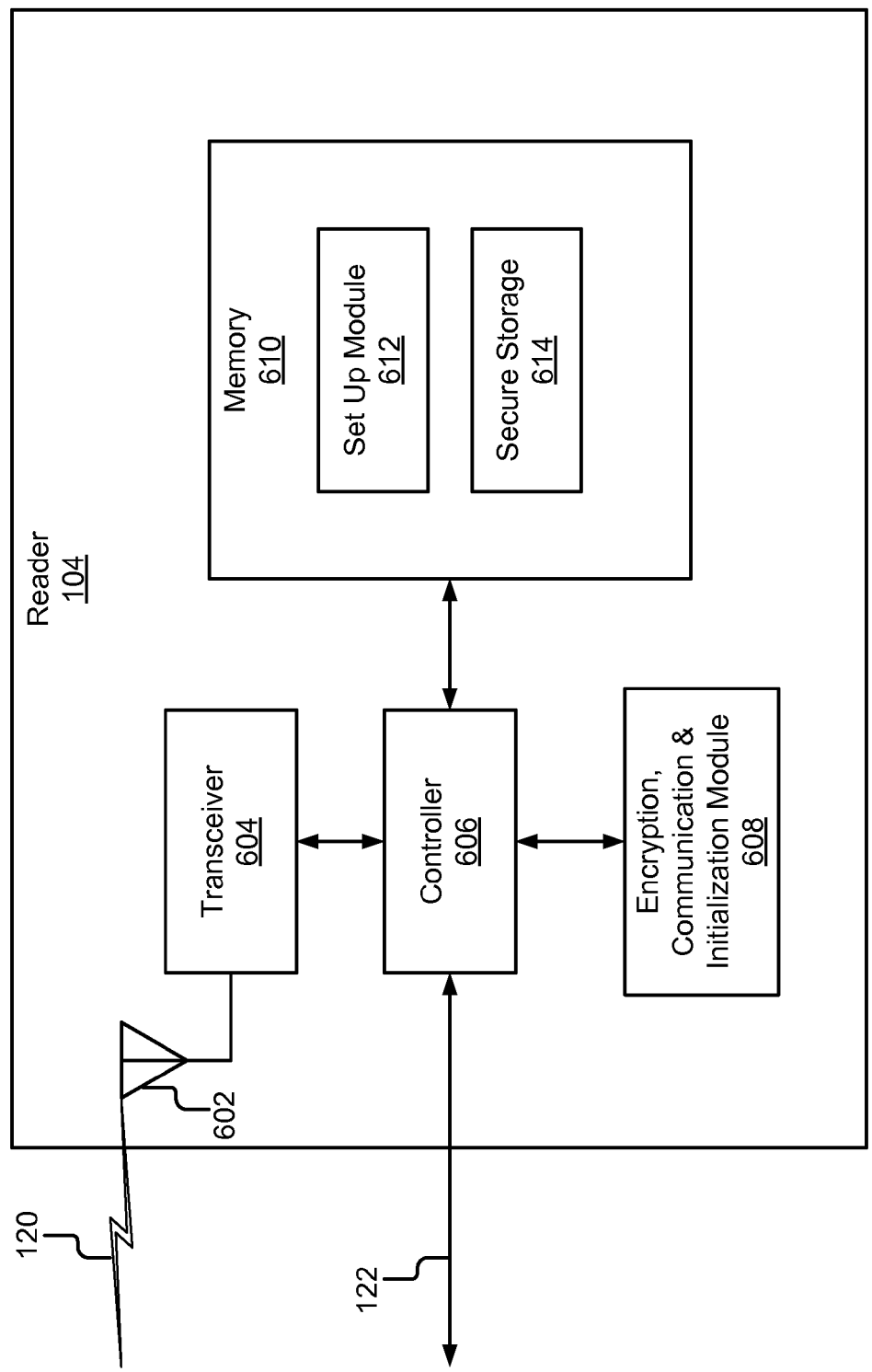
FIG. 6 is a block diagram of an embodiment of the reader in accordance with the present invention.

FIG. 6 is a block diagram of an embodiment of the reader 104 in accordance with the present invention. The reader 104 comprises an antenna 602, a transceiver 604, a controller 606, an encryption, communication and initialization module 608 and a memory 610. The memory 610 further comprises a setup module 612 and secure storage 614. The antenna 602 is coupled to the transceiver 604 and enables wireless communication between the reader 104 and the PDK 102. Even though only a single PDK 102 shown in FIGS. 1 and 2, it should be understood that the reader 104 communicates with and establish a link 120 with a plurality of PDKs 102. The transceiver 604 is coupled to the controller 606 to provide data received from the PDK 102 and to send data to the PDK 102. The controller 606 is coupled to and controlled by the encryption, authentication and initialization module 608. The encryption, authentication and initialization module 608 provides functionality similar to that described above with reference to FIG. 5, but for the reader 104. For example, the controller 606 under the direction and control of the encryption, authentication and initialization module 608: encrypts and decrypts information for storage in and retrieval from the memory 610, respectively; initializes the reader 104 such as recording setup information in the setup module 612 of the memory 610; and controls the communication with the PDK 102 via link 120 and the communication with the computing device 106 via signal line 122. As noted above, the memory 610 includes a setup module 612 and secure storage 614. The reader 104 includes two types of set up information that are stored in the setup module 612. First, set up information that is utilized for the reader 104 itself is stored in the setup module 612. Second, set up information that is sent to and loaded into the computing device 106 to initialize the computing device 106 is also stored in the setup module 612. In another embodiment, the setup module 612 also includes any other applications needed, and these applications can be loaded from the setup module 612 into the computing device 106. Under the direction of the encryption, communication and initialization module 608 the controller 606 retrieves this information from the setup module 612 and loads it into the computing device 106. The reader 104 also includes secure storage 614 for use when critical confidential data is passed from the PDK 102 through the reader 104 to the computing device 106. The secure storage 614 is used in conjunction with the encryption functionality provided by module 608 to store unencrypted data. The secure storage 614 is also used to store back-up passwords used to allow access to the computing device 106 when the PDK 102 is not in range.

Additional details about other embodiments of the reader or RDC 104 are shown and described in U.S. patent application Ser. No. 12/292,330, filed a Nov. 30, 2005 entitled "Personal Digital Key And Receiver/Decoder Circuit System And Method;" U.S. patent application Ser. No. 11/620,581, filed Jan, 5, 2007 entitled "Wireless Network Synchronization Of Cells And Client Devices On A Network;" U.S. patent application Ser. No. 11/744,831, filed May. 5, 2007, entitled "Two-Level Authentication For Secure Transactions;" and U.S. patent application Ser. No. 11/744,832, filed May. 5, 2007, entitled "Personal Digital Key Initialization And Registration For Secure Transactions;" the contents of which are incorporated by reference herein in their entirety.

Figure 7:
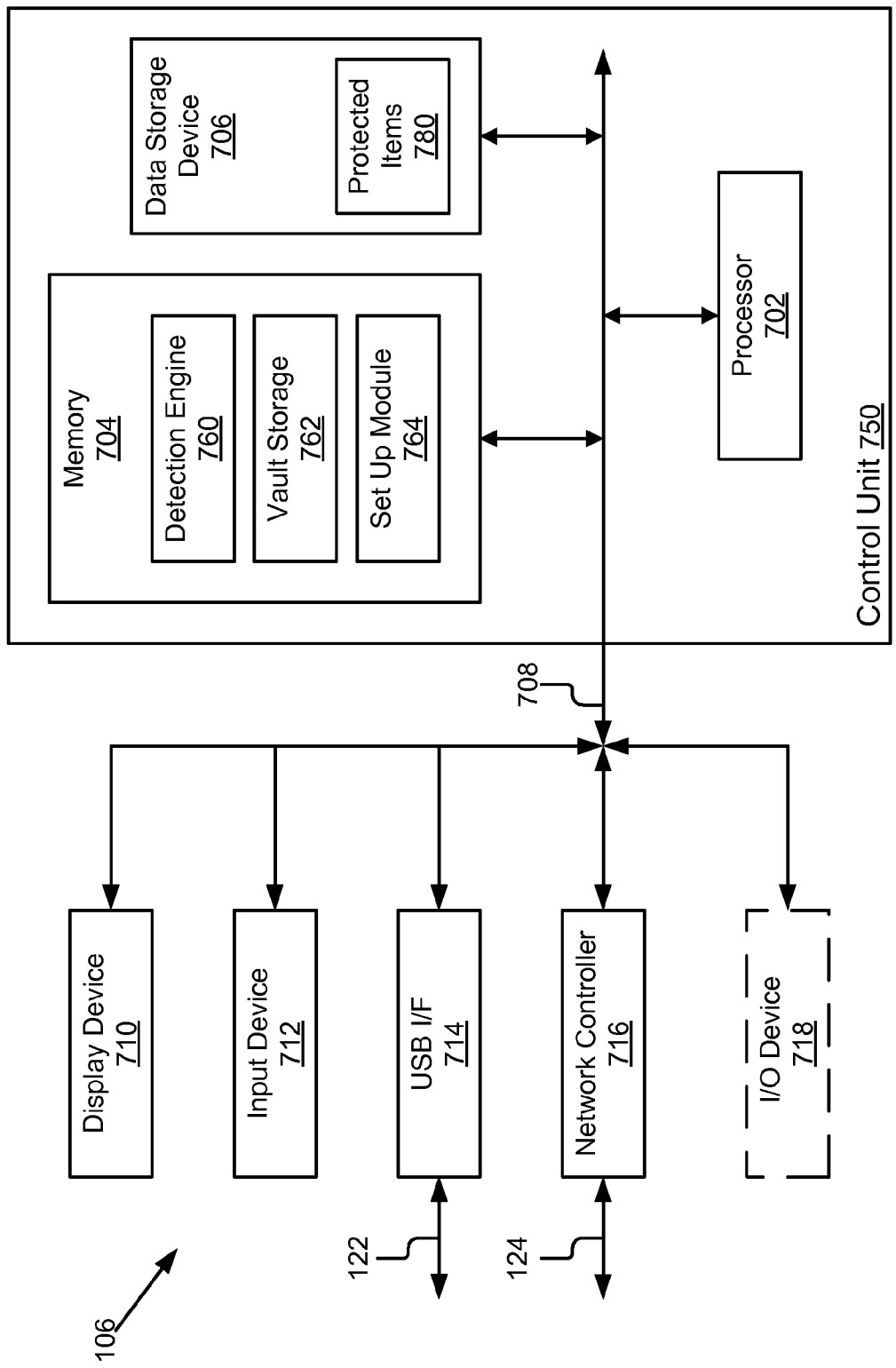
FIG. 7 is a block diagram of an embodiment of the computing device in accordance with the present invention.

Referring now also to FIG. 7, a functional block diagram of the computing device 106 configured in accordance with an embodiment of the present invention is shown. The computing device 106 comprises a control unit 750, a display device 710, an input device 712 and a Universal Serial Bus (USB) interface 714. The computing device 106 may optionally include a network controller 716 and one or more input/output (I/O) devices 718. Those skilled in the art will recognize that FIG. 7 nearly depicts one embodiment of the computing device 106 in which it is a personal computer, and that their variety of other embodiments where the computing device 106 has a different configuration. Nonetheless, in most of these other configurations some or all of the components described below with reference to FIG. 7 have a similar or equivalent functionality in the other embodiments of the computing device 106.

The control unit 750 comprises an arithmetic logic unit, a microprocessor, a general purpose computer or some other information appliance equipped to provide electronic display signals to display device 710. In one embodiment, the control unit 750 comprises a general purpose computer having a graphical user interface, which may be generated by, for example, a program written in Java running on top of an operating system like WINDOWS® or UNIX® based operating systems. In one embodiment, one or more application programs are executed by control unit 750 including, without limitation, drawing applications, word processing applications, electronic mail applications, financial applications and web browser applications.

Still referring to FIG. 7, the control unit 750 is shown as including processor 702, memory 704 and data storage device 706, all of which are communicatively coupled to system bus 708.

Processor 702 processes data signals and may comprise various computing architectures including a complex instruction set computer (CISC) architecture, a reduced instruction set computer (RISC) architecture, or an architecture implementing a combination of instruction sets. Although only a single processor is shown in FIG. 7, multiple processors may be included.

Memory 704 stores instructions and/or data that may be executed by processor 702. The instructions and/or data may comprise code for performing any and/or all of the techniques described herein. Memory 704 may be a dynamic random access memory (DRAM) device, a static random access memory (SRAM) device, some other memory device known in the art or any combinations of the preceding. In one embodiment, the memory 704 also includes an operating system such as one of a conventional type such as, WINDOWS®, SOLARIS® or LINUX® based operating systems. Although not shown, the memory unit 704 may also include one or more application programs including, without limitation, drawing applications, word processing applications, electronic mail applications, financial applications and web browser applications. Those skilled in the art will recognized that while the present invention will now be described as modules or portions of a memory unit 704 of a computer system 100, the modules or portions thereof may also be stored in other media such as permanent data storage device 706 and may be distributed across a network 108 having a plurality of different computers such as in a client/server environment. The memory 704 is shown as including a detection engine 760, vault storage 762 and a set up module 764. These modules 760, 762, 764 are coupled by bus 708 to the processor 702 for communication and cooperation to system 100.

The detection engine 760 is instructions and/or data that may be executed by processor 702. The instructions and/or data comprise code for performing any and/or all of the techniques described herein. More specifically, the detection engine 760 detects when a protected item is accessed, performs the process steps as specified by a set up record and also controls the processor 702 to perform encryption and decryption as necessary. The operation of the detection engine 760 is described in more detail below with reference to FIG. 11A-11D. The detection engine 760 is coupled to control the processor 702. The detection engine 760 is also coupled to the protected items 780 and/or the processor 702 to determine when the protected items 780 are accessed. For example, the detection engine 760 is coupled to either the processor 702 or this data storage device 706 to determine when the protected items 780 are accessed.

The vault storage 762 is a portion of memory 704 used to store information utilized by the detection engine 760 to control operation of the security system 100 of the present invention. In one embodiment, the vault storage 762 is encrypted so that its contents cannot be accessed and utilized by other devices or programs or decoded for circumvention. In another embodiment, the vault storage 762 is locked or controlled in a manner such that only the detection engine 760 may access and use the information stored in the vault storage 762. The vault storage 762 stores security set up data for the secure items on the computing device 106. For example, this security set up data includes a plurality of item set up records, where each item set up record corresponds to a protected item 780. It should be understood that the vault storage 762 includes one vault file per computing device 106/PDK 102 pair. The PDK 102 of the computing device 106/PDK 102 pair is preferably a master PDK. In another embodiment, the vault file also includes information about other proxy PDKs related to the master PDK and a backup password. The set up records stored in the vault file corresponding to each of the protected items 780 and specify the process that must be undertaken in order to grant access to the particular protected item 780. In a second embodiment, the vault storage 762 includes a plurality the sub-vaults, optionally implemented utilizing a directory/subdirectory where each "secured type" is maintained in its own file. An extension of this concept includes maintaining complete subdirectories (within the primary Vault directory) for each "secured type" (in place of individual files for each). In a third embodiment, the vault storage 762 is maintained as a group of individual files (within a primary Vault directory), and the processor 702 gathers analytics data such a key use, access privileges, usage stats, etc, for each. In a fourth embodiment, the vault storage 762 is located on the PDK 102 as opposed to the computing device 106. This option enables additional methods for managing secured files as they are moved, copied, and transferred. As with the vault storage 762 located on computing device 106, a "backup" password may also be utilized to unlock access to the vault storage 762 in situations where biometric authentication options are unavailable. In a fifth embodiment, the vault storage 762 is utilize an "assigned ID", stored in & read from the PDK 102, in addition to, or in place of, a PDK's ID. This option enables another method for allowing multiple PDKs to access secured types as a "group". Example uses include enabling groups of PDKs/users to access files, storage devices, and even applications.

The set up module 764 is instructions and/or data that may be executed by processor 702 for initializing and setting up the computing device 106. The operation of the set up module 764 is described in more detail below with reference to FIGS. 8 and 9. The set up module 764 cooperates with the set up module 612 of the reader 104. In particular, the set up module 764 accesses the reader 104 to retrieve set up module 612 and copy that information into the memory 704 of the computing device 106. The set up module 612 is then executed by the processor 702 to generate the item setup records and store them in the vault storage 762. The set up module 612 also retrieves additional applications stored at the reader 104 and install and upload them on the memory of the computing device 106.

Data storage device 706 stores data and instructions for processor 702 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage device 706 also stores protected items 780. For example, the protected items 780 include storage devices such as data storage device 706, directories and files such as for data on the data storage device 706 and sign-on screens such as generated in a web browser. If a storage device is a protected item 780 that means that all data on the storage device is encrypted and access to it is protected. If directories or files are protected items 780, that means that the directory or file is encrypted and access is protected. If a sign-on screen is a protected item 780, any time that sign-on screen is displayed, the detection engine 760 detects its display and retrieves information necessary to complete the sign-on screen from a corresponding item set up record in the vault storage 762 and processes as needed. In other embodiments, protected items 780 includes information used in e-commerce, electronic signatures, digital signatures, licensee key management information for digital rights management.

System bus 708 represents a shared bus for communicating information and data throughout control unit 750. System bus 708 may represent one or more buses including an industry standard architecture (ISA) bus, a peripheral component interconnect (PCI) bus, a universal serial bus (USB), or some other bus known in the art to provide similar functionality. Additional components coupled to control unit 750 through system bus 708 include the display device 710, the input device 712, the USB interface 714, the network controller 716 and the I/O device(s) 718.

The display device 710 represents any device equipped to display electronic images and data as described herein. In one embodiment, the display device 710 is a liquid crystal display (LCD) and light emitting diodes (LEDs) similar to those on many personal computers to provide status feedback, operation settings and other information to the user. In other embodiments, the display device 710 may be, for example, a cathode ray tube (CRT) or any other similarly equipped display device, screen or monitor. In one embodiment, the display device 710 is equipped with a touch screen and/or includes a digitizer in which a touch-sensitive, transparent panel covers the screen of display device 710.

In one embodiment, the input device 712 is a series of buttons coupled to control unit 750 to communicate information and command selections to processor 702. The buttons are similar to those on any conventional computer. In another embodiment, the input device 712 includes a keyboard. The keyboard can be a QWERTY keyboard, a key pad, or representations of such created on a touch screen. In yet another embodiment, the input device 712 includes cursor control. Cursor control represents a user input device equipped to communicate positional data as well as command selections to processor 702. Cursor control 712 may include a mouse, a trackball, a stylus, a pen, a touch screen, cursor direction keys or other mechanisms to cause movement of a cursor.

The USB interface 714 is of a conventional type and is coupled to bus 708 for communication with the processor 702.

The network controller 716 links control unit 750 to a network 108 via signal line 124. The network may comprise a local area network (LAN), a wide area network (WAN) (e.g., the Internet), and/or any other interconnected data path across which multiple devices may communicate. The control unit 750 also has other conventional connections to other systems such as a network for distribution of files (media objects) using standard network protocols such as TCP/IP, http, https, and SMTP as will be understood to those skilled in the art.

As denoted by dashed lines, the computing device 106 may optionally include one or more input/output (I/O) devices 718 such as described below. One or more I/O devices 718 are coupled to the bus 708. These I/O devices may be part of computing device 106 in one embodiment and in another embodiment may be part of the other systems (not shown). For example, the I/O device 718 can include an image scanner for capturing an image of a document. The I/O device 718 may also includes a printer for generating documents. The I/O device 718 may also include audio input/output device equipped to receive audio input via a microphone and transmit audio output via speakers. In one embodiment, audio device is a general purpose; audio add-in/expansion card designed for use within a general purpose computer system. Optionally, I/O audio device may include one or more analog-to-digital or digital-to-analog converters, and/or one or more digital signal processors to facilitate audio processing.

It should be apparent to one skilled in the art that system 100 may include more or less components than those shown in FIG. 7 without departing from the spirit and scope of the present invention. For example, security system 100 may include additional memory, such as, for example, a first or second level cache, or one or more application specific integrated circuits (ASICs). Similarly, additional components input/output devices 718 may be coupled to control unit 750 including, for example, an RFID tag reader, digital still or video cameras, or other devices that may or may not be equipped to capture and/or download electronic data to control unit 750. One or more components could also be eliminated such as the keyboard & cursor control 712.

Figure 8:
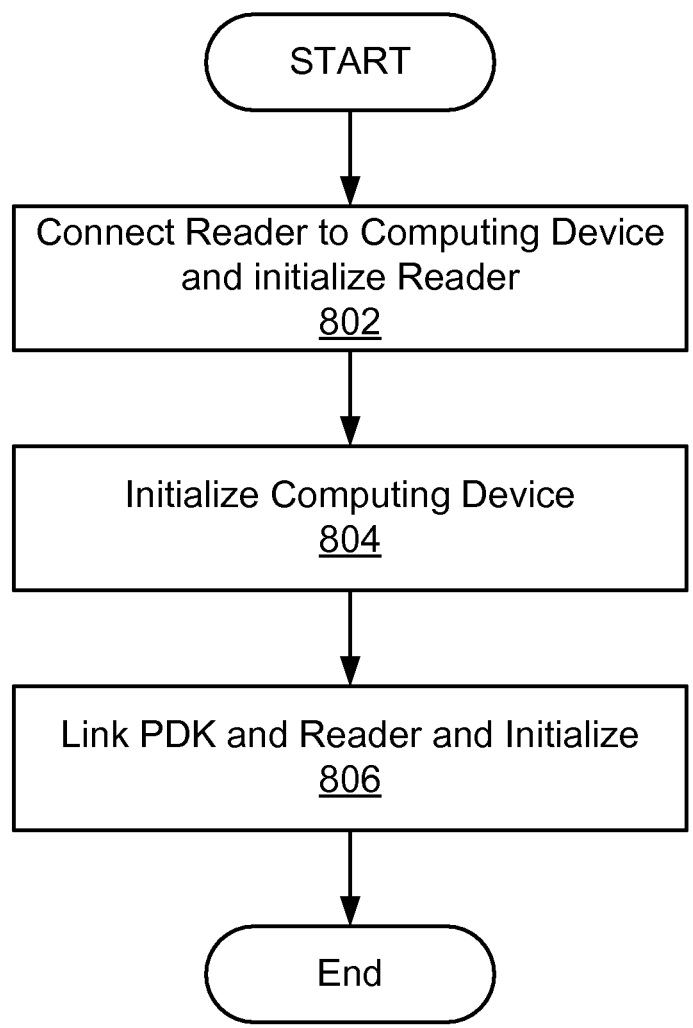
FIG. 8 is flowchart of a first embodiment of a method for initializing the security system in accordance with the present invention.
Figure 10:
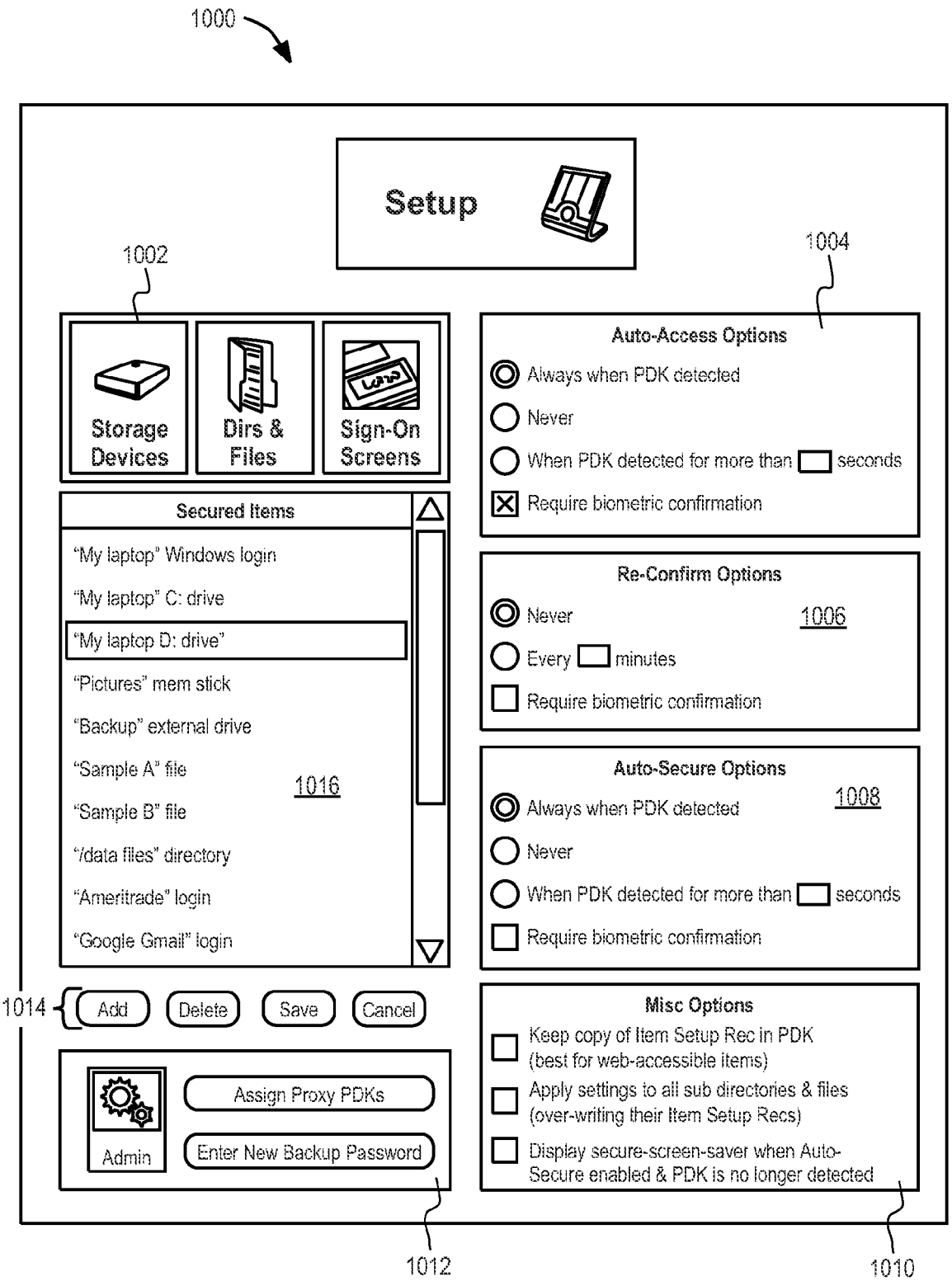
FIG. 10 is graphic representation of a set up user interface in accordance with one embodiment of the present invention.
Figure 11A:
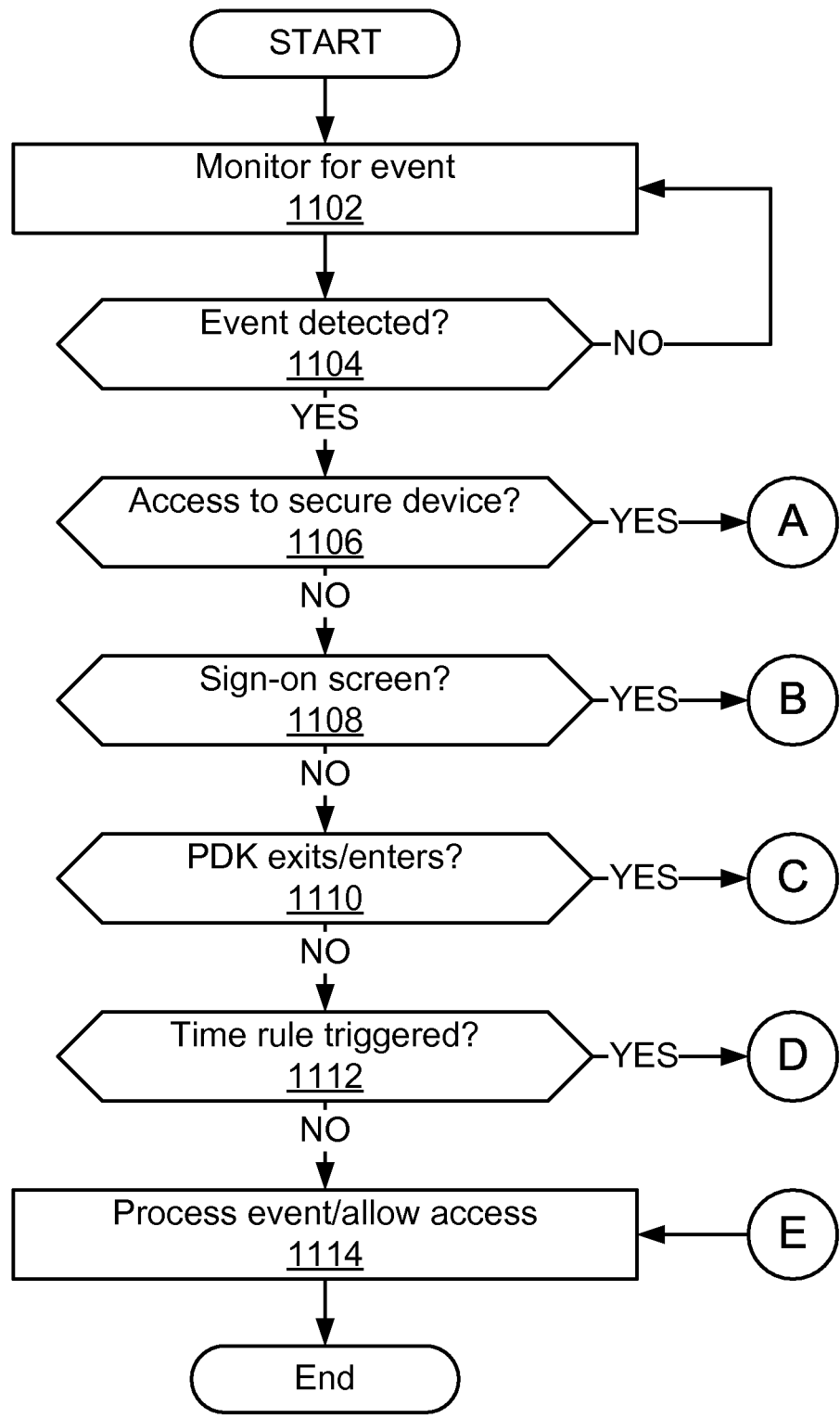
FIGS. 11A-11E are a flowchart of an embodiment of a method for controlling access to computing resources in accordance with the present invention.
Figure 11B:
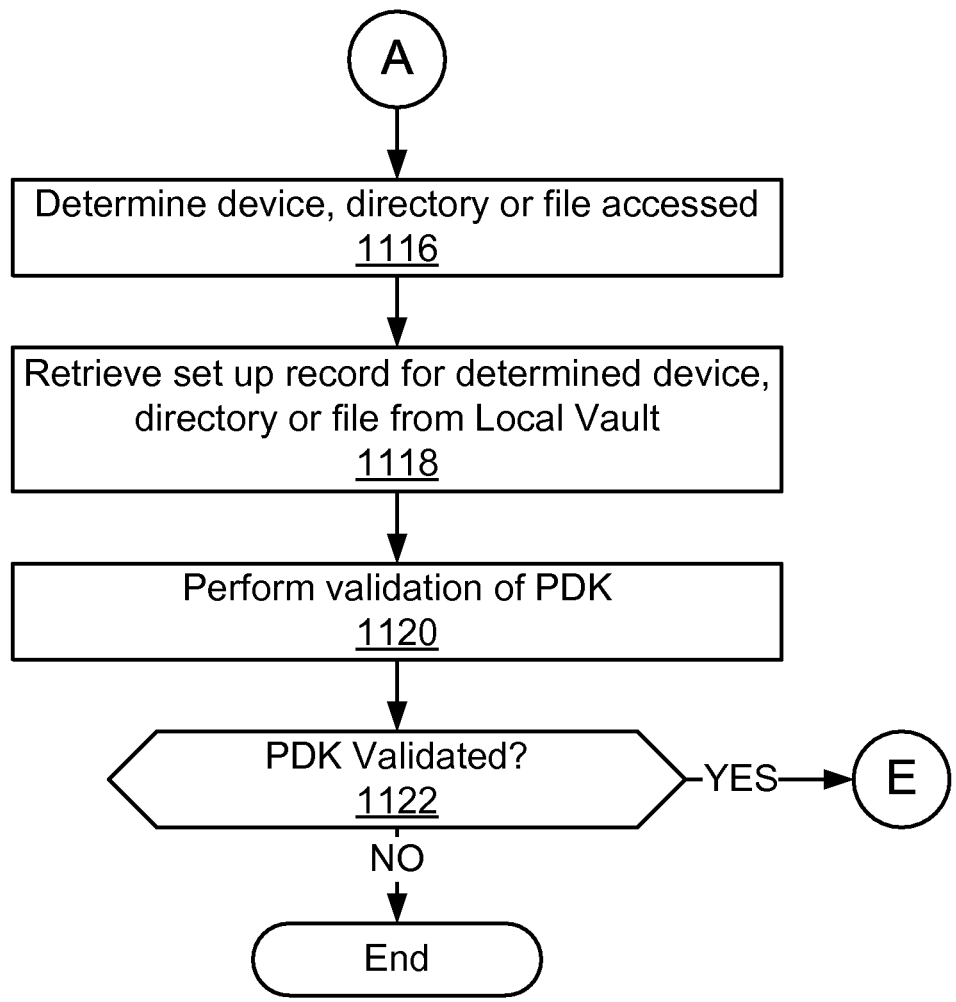
Figure 11C:
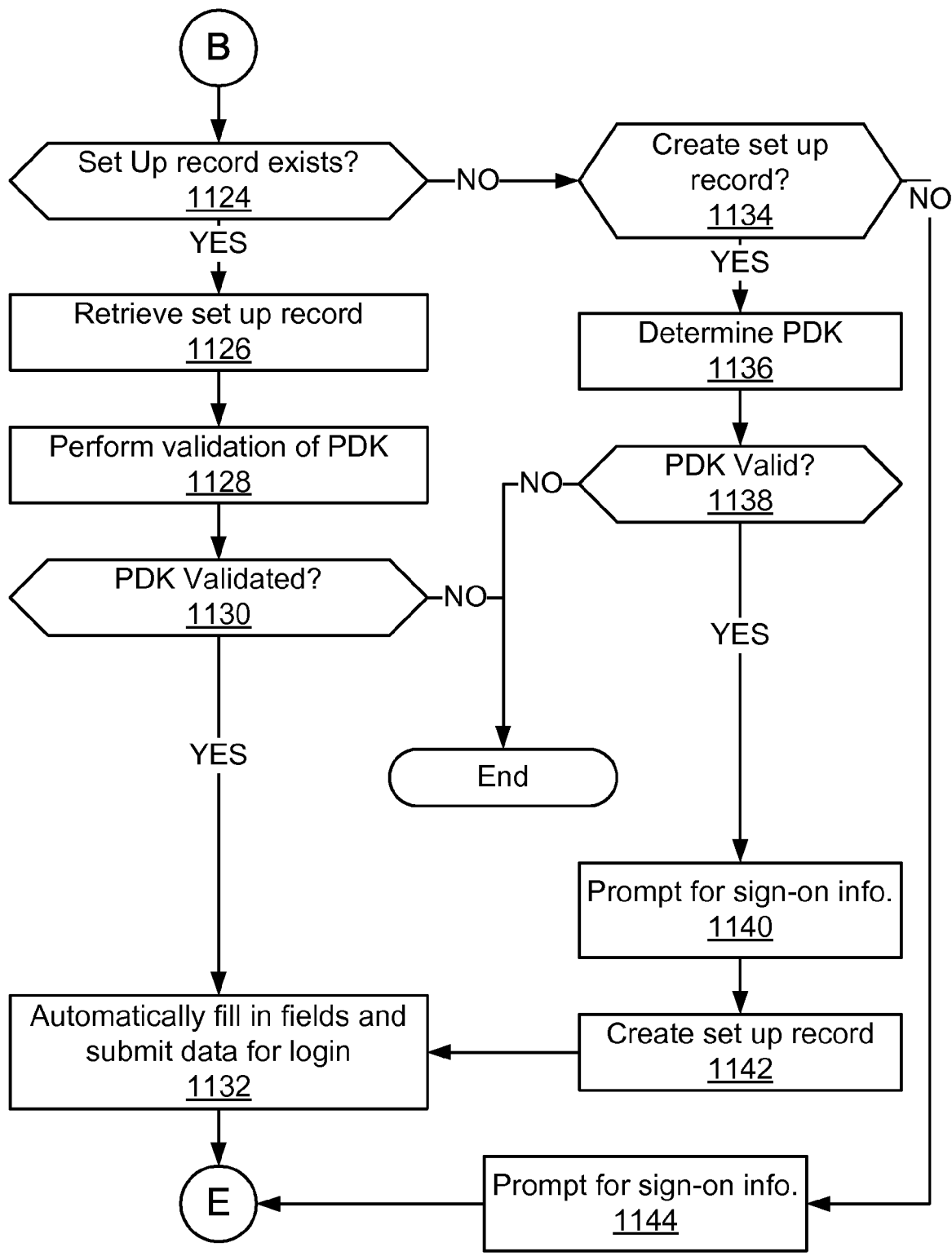
Figure 11D:
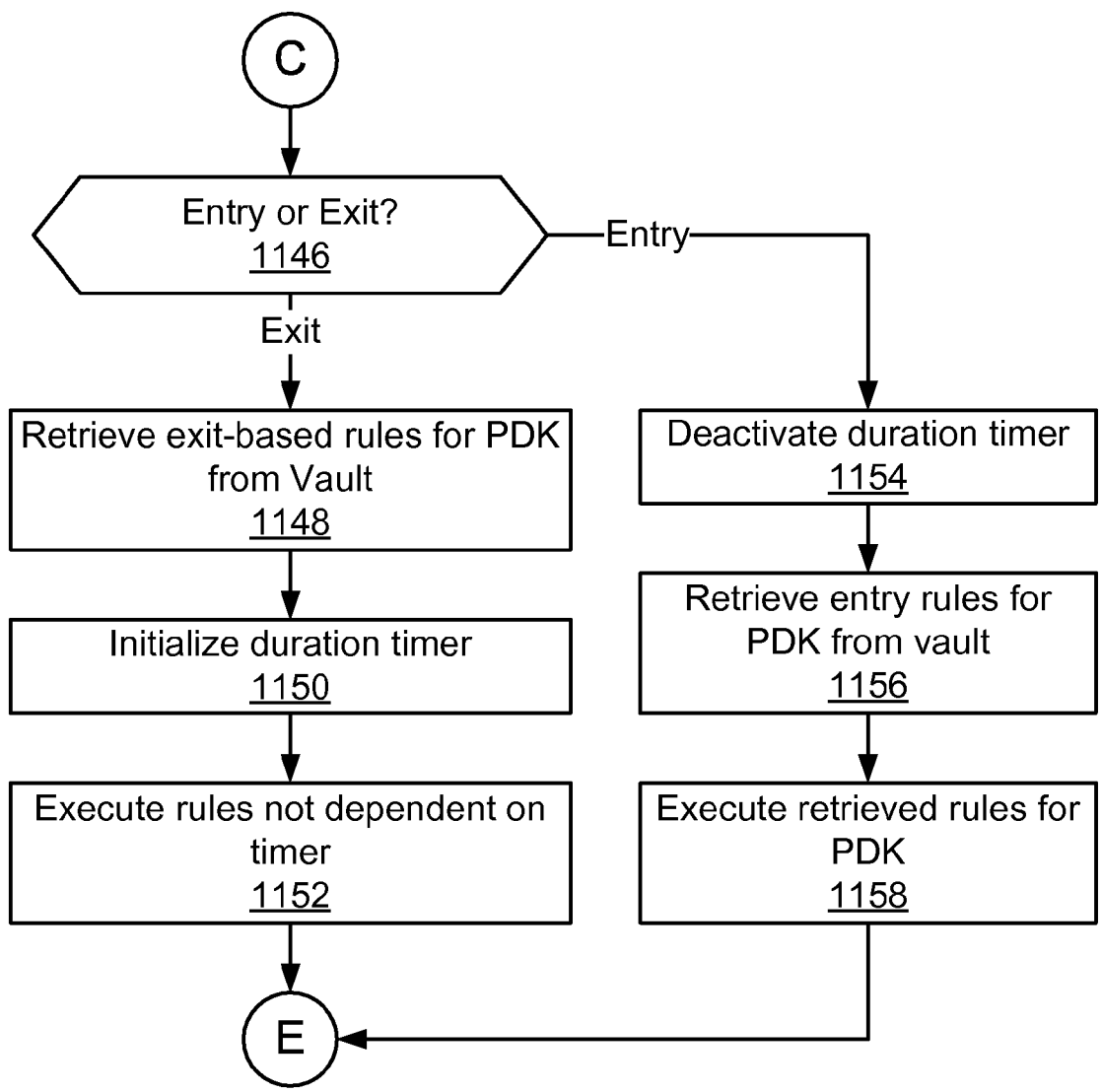
Figure 11E:
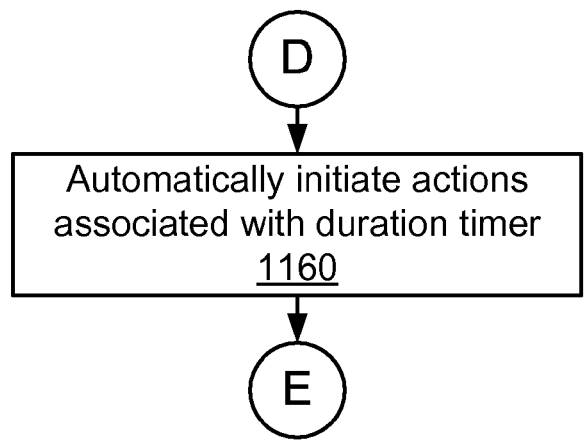

FIG. 8 shows a first embodiment of a method for initializing the security system 100 in accordance with the present invention. The method begins by connecting 802 the reader 104 to the computing device 106 and initialize reader 104. Once reader 104 is connected to the computing device 106, it receives power from computing device 106. The reader 104 upon power up performs 802 initialization of its own systems and also begins communication with the computing device 106. In particular, the reader 104 loads drivers on the computing device 106 such as its operating system (e.g., Windows) so that the reader 104 and the computing device 106 can communicate with each other. In another embodiment, the drivers may be provided on another media such as a flash drive or CD and loaded into the computing device in a conventional manner. Once the reader 104 is operational it is like a portal, in that it can link and communicate with any PDK 102. Next, the computing device 106 is initialized 804. More specifically, the computing device 106 downloads and runs the setup module 612 from the reader 104. This will also cause other applications required to be downloaded from the reader 104 to the computing device 106. Once the programs are downloaded from the reader 104 they are loaded and started. For example, the configuration application that generate and present the user interface of FIG. 10 is operation and presents the user interface 1000 so that the user's preferences for operation of the security system 100 can be entered. The initialization step 804 also creates the vault storage 764 on the computing device, load and start the detection engine 760. Finally, a PDK 102 is linked 806 to the reader 104 and initialized. In one embodiment, it is assumed that the PDK 102 has already been activated and associated with a user. Part of this activation process includes giving the PDK 102 a unique ID number and storing confidential information such as passwords and other data unique to the user in the PDK 102. The initialization of the PDK 102 process continues by identifying the PDK 102 and its unique ID so that this information can be used to determine when the PDK 102 comes within range of the reader 104 in the future. In particular, the PDK 102 is associated with the vault storage created in step 804. The first PDK 102 to interacts with the initialized computing device 106 is the master PDK 102. The master PDK 102 is the owner of the vault and acts like an administrator with the authorization to give proxies to other PDKs 102 that will allow them to access the vault but typically not to grant access to other PDKs 102. When the other PDKs are in range, the set up functionality of the computing device 106 is used for this assignment of rights (See FIG. 10, area 1012 below.) Once this is complete, the security system 100 is operational and ready for use.

Figure 9:
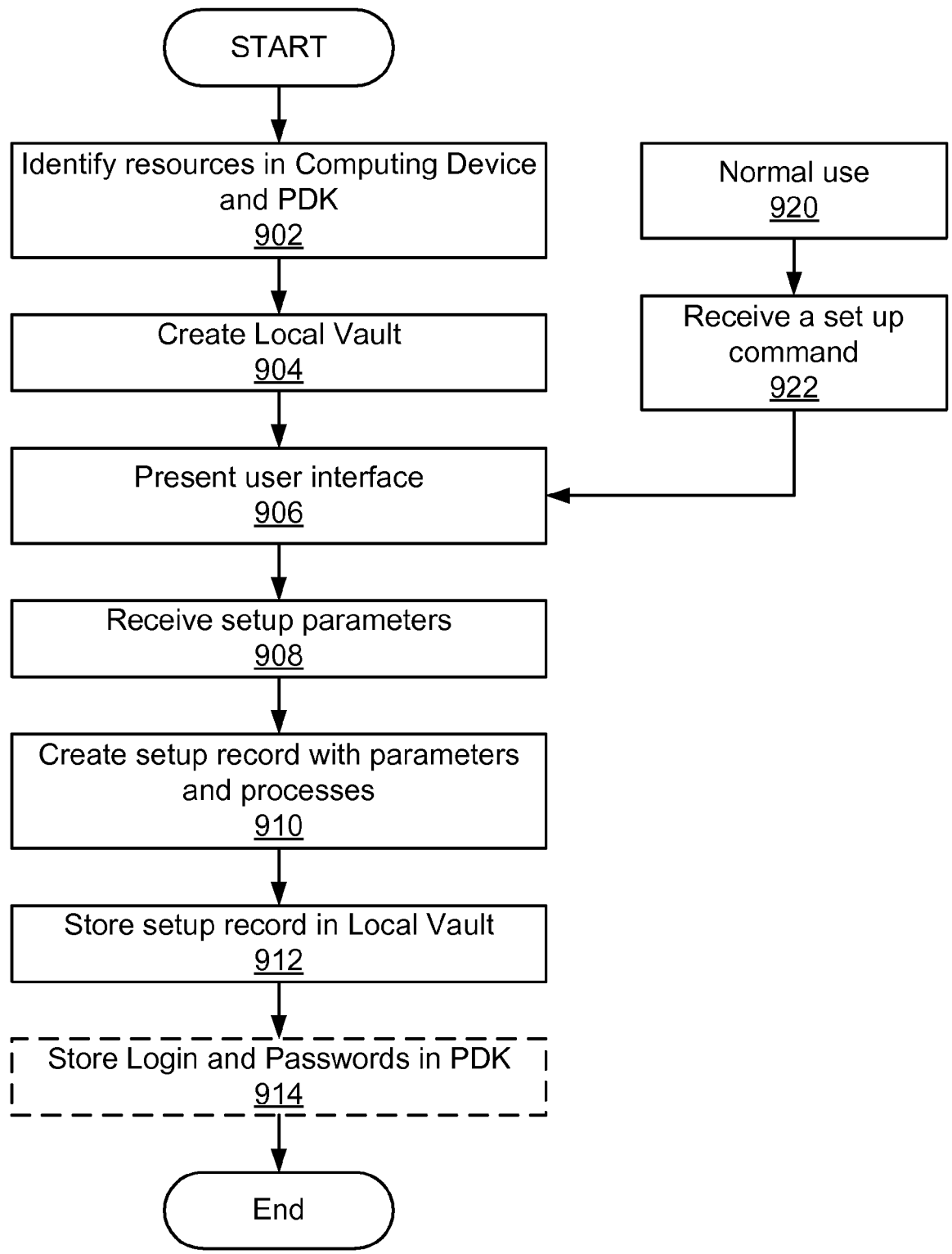
FIG. 9 is flowchart of a second embodiment of a method for initializing the security system in accordance with the present invention.

Referring now to FIG. 9, a second embodiment of the method for initializing the security system 100 in accordance with the present invention is shown. The method begins by identifying 902 computing resources in the computing device 106 and the PDK 104. This effectively identifies all possible items that can be protected items and thus subject to the access control and security constraints of the security system 100. This includes identifying disk drives, directories, files and sign-on screens that will be accessed via the security system 100. The method also identifies 902 PDKs 102 and the computing resource with which they are associated. Next, the method creates 904 a local vault or allocates memory 704 to create vault storage 762. The method then presents 906 a user interface on the computing device 106. For example, this is done with the user interface 1000 of FIG. 10 which will be described below. The user interacts with the interface 1000 and inputs a variety of a set up parameters. The computing device 106 receives 908 the setup parameters. Then the method creates 910 an item set up record with the parameters received from step 908 and specifying the processes performed when interacting with the item. The item set up record is a data record for a particular item holding the details of the detection engine 760 requires to correctly process (allow access or otherwise interact with) the item. In one embodiment, the item set up record includes information about how to access the item, whether the data is encrypted, etc. but does not store the decryption key or other actual security data as it is provided by the PDK 102. Next, the method stores 912 the item set up record in the vault storage 762 or local law. In some embodiments, the PDK 102 stores login information passwords such as needed for sign-on screens. For such cases the method also stores 914 this information in the PDK 102 during this initialization process. The present invention is particularly advantageous because the item set up records are stored in the vault storage 762 while the login information needed for sign-on is stored in the PDK 102, thus enabling maximum mobility. It should be understood that the reader 104 does not store any runtime information but merely acts as a means for the PDK to interact with the computing device 106, in particular, the protected items 708. When the security system 100 is operational, the detection engine 760 searches the vault storage 762 for instructions on how interaction with the protected item is undertaken at and accesses the PDK 102 if needed as appropriate. It should be understood that in one embodiment, the item set up records are processed hierarchically where the set up rules specified in a item set up record for file override the set up rules specified in an item set up record for directories, and the set up rules specified in an item set up record for a directory overrides the set up rules specified in an item set up record for a component (e.g., the entire data storage device 706).

As also shown in FIG. 9, in addition to the manual setup using user interface 1000 of FIG. 10 when the security system 100 is initially put into operation, the user may at any time during normal use 920 input command indicating that they would like to apply security constraints to an item. For example, during all operation of the computing device 106, the user may just drive and right click the mouse cursor on the icon to input a set up command to the security system 100. The system receives 922 set up command and then proceeds to perform steps 906 through 914 as has been described above. This is particularly advantageous because it allows the user at any time to modify, add or remove security controls from protected item.

Referring now FIG. 10, one embodiment of the set up user interface 1000 in accordance with the present invention will be described. The user interface 1000 includes a plurality of areas 1002, 1004, 1006, 1008, 1010, 1012, 1014 and 1016 to specify the item to be protected as well as actions or rules to be followed in granting access to the protected item. In a first region 1002, the user interface 1000 present buttons representing major categories of items that can be protected. For example, the buttons shown in FIG. 10 are three possible protected items including: storage devices, directories and files, and sign-on screens. In another embodiment, additional buttons may be provided for services such as e-commerce, digital signature, and electronic identification. Those skilled in the art will recognized that any number of buttons may be provided depending on the categories of items that are protected by the security system 100. Selecting a button in the first region 1002, causes the items displayed in window 1016 to be limited to those items that are in the selected category. The window 1016 may also be used to select a particular item from the list of items displayed in the window 1016. However as shown in FIG. 10, since no button has been selected the items of all categories are shown in the window 1016. Below the window 1016, the user interface 1000 presents a series of buttons 1014 selectable to add, delete or save the input parameters of the user interface 1000 as an item set up record. An additional button is provided for canceling the setup process. Those skilled in the art will recognize that a similar version to the user interface 1000 shown in FIG. 10, but pre-populated with information about a specific device or item, is presented when the user accesses the set up interface 1000 via a direct command (e.g., right mouse click) such as described above with reference to step 922 of FIG. 9. The regions 1004, 1006, 1008 on the right side of the user interface 1000 provides regions in which the user can specify what actions the security system 100 will perform when allowing or denying access to the protected items. For example, region 1004 presents options for whether access will be automatically allowed when the PDK 102 is detected as being within range of that reader 104. Region 1006 specifies reconfirmation options in which the user can specify how often the security system 100 must confirm that the PDK 102 continues to be within range of the reader 104. Moreover, the user can specify that biometric confirmation is required in addition to the PDK 102 being present. Such biometric confirmation can be provided by a biometric reader on the PDK 102, the reader 104 or other device connected to the computing device 106. Region 1008 allows the user to specify automatic securing options for specifying what action will be taken by the security system 100 when the PDK 102 is not detected, or a PDK 102 removal event is received. Yet another region 1010 allows the user to specify a number of other miscellaneous options. These miscellaneous options may be presented or removed depending on the type of item selected and displayed in window 1016. One option is to keep a copy of the item set up record in the PDK 102. This option is only available for the sign on setup. Another option is to apply settings to all directories and files (overriding their items set up record). This option is only available when the item type is a storage device or a directory. A third miscellaneous option is displaying a secure screen-saver when the auto-secure option is enabled and the PDK is no longer detected. While this option is available for any item it has a default setting of being selected for all items. Finally, the last region 1012 provides an area in which PDKs 102 can be grouped or assigned proxies. This last region 1012 also provides an option for inputting a backup password that can be used to enable the system when the PDK 102 is not available.

Referring now to FIGS. 11A-11E, an embodiment of a method for controlling access to computing resources in accordance with the present invention is described. Referring specifically to the FIG. 11A, the method begins by monitoring 1102 for an event or trigger. An event is any attempt by the computing device 106 to access a storage device, to access a directory, to access a file, any time a login screen is displayed, or any time based trigger. While the present invention will now be described in the context of these events, those skilled in the art will recognize that other events involving the use of other computing resources of the computing system 106 may also have an item set up record established and stored in the vault storage 762 such that the use of those computing resources is controlled by the security system 100 of the present invention in a manner similar to that described below for storage devices, files, directories and sign-on screens. Next, the method determines 1104 whether an event was detected. In one embodiment, the monitoring and detecting is performed by detection engine 760. If the method determines that an event was not detected, the method returns to step 1102 to continue to monitor for events. However, if the method determines that an event was detected the method continues in step 1106. In steps 1106, 1108, 1110 and 1112, the method proceeds to determine the event type and perform the associated steps for that event type. If an event was detected but is not any of the types that the security system 100 protects, the method continues in step 1114 and processes the event and allows access to the computing resource as normal after which the process is complete and ends Referring now also to FIG. 11B, in step 1106, the method determines whether the event is an access to a secure device, file or directory. If not the method continues to step 1108 to determine whether the event was the presentation of a sign-on screen. However, if the method determined that the event is to access a secure device, the method continues to step 1116 of the FIG. 11B. The method determines 1116 the device, directory or file being accessed. Then the method retrieves 1118 the item set up record for the device, directory or file determined in step 1116 from the vault storage 762 and determines requirements for allowing access to the storage device directory or file. For example, the item set up record may specify whether access requires encryption. Those skilled in the art will recognize that any number of other requirements may be enforced by the security system 100 by adding them as requirements to the item set up record. These steps for the protected item will be performed as it is accessed and after the PDK identified in the item step up record is validated. Next, the method performs validation 1120 of PDK 102. In particular, the detection engine utilizes the reader 104 to conduct the appropriate authentication/validation, for example, requiring that the PDK 102 associated with the item set up record be within range of the reader 104. Then the method tests 1122 whether the PDK 102 was validated. If not the method is complete and ends with the security system 100 precluding access to the device, files or directory. In one embodiment, the security system 100 also displays appropriate message indicating that access was denied and correct steps that can be taken. On the other hand, if the PDK 102 was validated, the method transitions from step 1122 to step 1114 of FIG. 11A to process the event and allow access as normal. The requirements from the item set up record are also preformed prior to or during normal access to the device, files or directory In step 1108, the method determines whether the event was the presentation of a sign-on screen. If not the method continues to step 1110. However, if the method determined that the event was the presentation of a sign-on screen, the method continues to step 1124 of the FIG. 11C. Initially, the method determines whether an item setup record corresponding to the sign-on screen exists. If so, the method retrieves 1126 the item setup record from the vault storage 762. Then the method performs validation of 1128 of the PDK 102 and determines 1130 whether the PDK 102 is valid. If not the method is complete and ends with the security system 100 denying access to access to the sign-on screen, and thus other third party systems. However if the PDK 102 is validated, the detection engine 760 automatically fills in the fields of the sign-on screen with the information from the item setup record and submits the data for log-in. The method then returns to step 1114 of FIG. 11A to continue processing as normal. However if in step 1124, it is determined that an item set up record corresponding to the sign-on screen does not exist, the method prompts the user to determine whether to create 1134 an item setup record for this sign-on screen. If the user does not want to create a setup record, the method proceeds to step 1144 and prompts the user to manually enter the sign-on information and then continues to step 1114 of FIG. 11A to continue processing as normal. However, if the user does want to create a setup record for future use for this sign-on screen, the method continues to determine the PDK 102 for the user and whether it is in range. Then the method determines 1138 whether the PDK 102 is valid. If not, the method is complete and ends. Since the user does not have a valid PDK 102 they are not allowed to create a new record in the security system 100. On the other hand if the PDK 102 is determined to be valid in step 1138, the method prompts 1140 the user for sign-on information and receives the sign-on information. Then the method creates 1142 a new set up record corresponding to the sign-on screen and including the sign-on information received in step 1140 and stores it in the vault storage 762. The method continues to automatically fill in 1132 the fields and submit the data for login after which it proceeds to step 1114 of FIG. 11A for processing as normal.

In step 1110, the method determines whether the event was the detection of a PDK 102 entering or exiting the range of the reader 104. If not, the method proceeds to step 1112 tests for other types of events. However if the method determined that the event was the detection of a PDK 102 entering or exiting the range of the reader 104, the method proceeds to step 1146 of FIG. 11D. In step 1146, the method determines whether the event was the entry or exit of the PDK 102. If it was the exit of the PDK 102 from the range of the reader 104, the detection engine 760 retrieves 1148 exit-based rules corresponding to the PDK 102 from the vault storage 762. The detection engine 760 also determines which if any of the exit-based rules have a time dependency (e.g., an amount of time must lapse before they can be performed.) Then the detection engine 760 initializes 1150 the duration timer and provides it with the time dependent exit rules. Next, the method executes rules that are not dependent upon the duration timer and that should be executed when the PDK 102 exits the range of the reader 104. For example, depending on the configuration parameters entered by the user during initialization, some of the actions taken when the PDK exits the range of the reader 104 will be executed immediately once removal of the PDK 102 from the vicinity of the reader 104 is detected. Any such actions can be determined by reading the item set up record. Examples of such actions include automatically logging out, closing a window, or initializing the screensaver. After step 1152, the method transitions back to step 1114 of FIG. 11A. If in step 1146 the event was a determined to be the entry of a PDK 102 into the range of the reader 104 the method continues to deactivate 1154 any timers associated with the PDK 102 that are operational. The method retrieves 1156 an item set up record corresponding to the PDK 102 from the vault storage 762. The method then extracts rules from the item set up record and executes 1158 the extracted rules. For example, actions such as clearing a screensaver, launching a window, or retrieving, entering and submitting login data are executed in step 1158. After step 1158, the method transitions back to step 1114 of FIG. 11A.

In step 1112, the method determines whether the event was the detection of expiration of the duration timer. If not, the method proceeds to step 1114 to allow access as normal. However, if the event was the detection of expiration of the duration timer, the method continues in step 1160 of FIG. 11E. In step 1160, the method determines automatically initiates action associated with the duration time. For example, these are any action specified by the item set up record when the duration timer was started. They can include logging out, activating a screen saver, etc. as specified above as immediate actions. Those skilled in the art will recognize that there may be a variety of times where the duration timer is set to avoid the security system 100 to initiate action, even though the PDK 102 has only be out of range momentarily.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for securing computing resources, the system comprising:
   a personal digital key adapted for wireless communication within a predefined range to establish a link and send and receive data, the personal digital key associated with a user and storing security data used to access a particular computing resource as described by security set up data for the particular computing resource;
   a reader for automatically detecting the presence of the personal digital key and establishing a link with the personal digital key, the reader having an input and an output and adapted for wireless communication with the personal digital key when the reader and the personal digital key are within the predefined range of each other, the reader automatically signaling a computing device whether it is linked to the personal digital key; and
   the computing device having computing resources including the particular computing resource, the computing device coupled to the input and the output of the reader for sending and receiving data; the computing device including a security system for controlling access to the computing resources of the computing device based on security set up data, wherein the security set up data is stored in a dedicated encrypted portion of a memory of the computing device and includes information on how to control access to the computing resources using security data, but does not include the security data used to obtain access, wherein the security set up data is based on one or more user defined options allowing the user to implement different security actions for different computing resources, wherein the different security actions include a biometric confirmation for a respective computing resource, the security system controlled by the signal from the reader indicating whether the reader is linked to the personal digital key and terminating access to the computing resource based on an exit-based rule of the security set up data associated with the computing resource when the personal digital key and the reader are no longer within the predefined range.

2. The system of claim 1 wherein the personal digital key includes a memory for storing security information.

3. The system of claim 2 wherein the security information includes sign-on information, set up information, user names and passwords.

4. The system of claim 1 wherein the reader includes a set up module for storing set up information utilized by the computing device to install the security system.

5. The system of claim 4 wherein the reader sends the set up information to the computing device during an initialization stage.

6. The system of claim 1 wherein the reader includes a transceiver for wirelessly communicating with the personal digital key and a USB connector for coupling to the computing device.

7. The system of claim 1 wherein the reader includes secure storage for storing back-up passwords used to allow access to the computing device when the personal digital key is not in range.

8. The system of claim 1 wherein the security system includes a detection engine for detecting when a computing resource is accessed and controlling
   whether access will be permitted, the detection engine coupled to control the computing device.

9. The system of claim 1 wherein the security system includes a set up module for initializing and installing a detection engine and the dedicated, encrypted portion of the memory of the computing device storing the security set up data, the set up module adapted for cooperation with the computing device.

10. A security system for controlling access to computing resources on a computing device, the security system comprising:
    a detection engine for detecting when a computing resource is accessed and controlling whether access is permitted based on detecting a personal digital key within a predefined range of a reader and based on security set up data, the detection engine coupled to the computing device and the computing resources; and
    a vault storage for storing security set up data for the computing resources, the vault storage stored in a dedicated encrypted portion of a memory of the computing device and including information on how to use security data stored by the personal digital key to control access to the computing resources, but does not include the security data used to obtain access, wherein the security set up data is based on one or more user defined options allowing a user to implement different security actions for different computing resources, wherein the different security actions include a biometric confirmation for a respective computing resource, the security set up data specifying at least one security action for the accessed computing resource, the at least one security action including an exitbased rule to terminate access to the computing resource when the personal digital key and the reader are no longer within the predefined range, the vault storage coupled to and accessible by the detection engine.

11. The security system of claim 10 comprising a set up module for initializing and installing the detection engine and the vault storage on the computing device, the set up module adapted for cooperation with the computing device.

12. A method for controlling access to a computing device having computing resources, the method comprising:
    monitoring, with the computing device, for an event;
    detecting, with the computing device, the event;
    determining whether a personal digital key is within a predefined range of the computing device responsive to detecting the event;
    allowing access to a computing resource when the personal digital key is within a predefined range of the computing device based on security data stored by the personal digital key and an item set up record stored in a dedicated encrypted portion of a memory of the computing device and including information on how to use the security data stored by the personal digital key to control access to the computing resource, the item set up record lacking the security data; and terminating access to the computing resource when the personal digital key is no longer within the predefined range of the computing device,
wherein allowing and terminating access is based on the item set up record associated with the computing resource, the item set up record including one or more user defined options allowing a user to implement different security actions for different computing resources, wherein the different security actions include a biometric confirmation for a respective computing resource.

13. The method of claim 12 wherein the event is one from the group of any attempt by the computing device to access a storage device, to access a directory, to access a file, any time a login screen is displayed or any time based trigger.

14. The method of claim 12 wherein determining whether a personal digital key is within the predefined range of the computing device includes receiving a control signal from a reader.

15. The method of claim 14 wherein determining whether the personal digital key is within the predefined range of the computing device includes determining whether the personal digital key is wirelessly linked to the reader coupled to the computing device.

16. The method of claim 12 wherein allowing access to one of the computing resources includes:
determining an item accessed; retrieving the item set up record corresponding to the determined item; and performing an action specified in the set up record.

17. The method of claim 16 wherein the action includes one from a group of clearing a screensaver, starting a screen saver, launching a window, closing a window, encrypting information, decrypting information, retrieving a password, storing a password or retrieving, entering and submitting login data.

18. The method of claim 12 wherein allowing access to the computing resource includes:
determining that item is accessed;
retrieving the item set up record corresponding to the determined item, the item set up record including a user name and password; and
automatically completing a sign-on screen by filling in fields using the user name and password, wherein the security data includes the username and password.

19. The method of claim 18 wherein retrieving the item set up record includes communicating with a personal digital key to retrieve the user name and password from the personal digital key.

20. The method of claim 12 wherein allowing access to the computing resource includes:
determining whether the item set up record exists for the one of the computing resources; identifying the personal digital key; receiving parameters for the item set up record; and creating a set up record including an identifier of the personal digital key and the received parameters.

21. The method of claim 12 comprising:
determining that the personal digital key (PDK) has moved within the predefined range of the computing device;
deactivating a duration timer;
retrieving entry rules associated with the PDK; and executing the retrieved rules.

22. The method of claim 12 comprising:
determining that the personal digital key (PDK) has moved outside the predefined range of the computing device;
retrieving exit rules associated with the PDK; and
executing the retrieved exit rules.

23. The method of claim 22 comprising: determining time-based rules from the retrieved exit rules; initializing a duration timer with the time based rules; and wherein executing the retrieved exit rules delays until the duration timer has lapsed before executing the time-based rules.

* * * * *